United States Patent [19]

Romer

[11] Patent Number: 4,987,294

[45] Date of Patent: Jan. 22, 1991

[54] OPTICAL SENSOR WITH PLUAL DETECTORS AND PULSE SANDWICHING

[75] Inventor: Andrew E. Romer, Bognor Regis, England

[73] Assignee: Rosemount Limited, United Kingdom

[21] Appl. No.: 389,838

[22] Filed: Aug. 4, 1989

[30] Foreign Application Priority Data

Aug. 24, 1988 [GB] United Kingdom ............... 8820086

[51] Int. Cl.$^5$ ............................................. H01J 40/14
[52] U.S. Cl. ............................. 250/208.1; 358/213.16
[58] Field of Search ....................... 250/208.1, 208.2; 358/213.16, 483, 214, 54, 228, 217, 212

[56] References Cited

U.S. PATENT DOCUMENTS

| | | | |
|---|---|---|---|
| 4,291,338 | 9/1981 | Thomas | 358/228 |
| 4,623,929 | 11/1986 | Johnson et al. | 358/214 |
| 4,716,456 | 12/1987 | Hosaka | 358/483 |
| 4,717,830 | 1/1988 | Botts | 358/213.16 |
| 4,783,702 | 11/1988 | Sone et al. | 358/213 |
| 4,827,145 | 5/1989 | Arques | 250/578 |

FOREIGN PATENT DOCUMENTS 0108308 10/1983 European Pat. Off. .
2593987 1/1986 France .

*Primary Examiner*—Davis C. Nelms
*Assistant Examiner*—Que Tan Le
*Attorney, Agent, or Firm*—Kinney & Lange

[57] ABSTRACT

An optical sensor comprises a plurality of light-sensitive members (10) each having an individually associated capacitor (11) which is charged with a current dependent upon the incident light sensed by the associated light-sensitive member (10); a light pulse source (12) providing light pulses from which the incident light is derived; and a control pulse source (14) providing pairs of consecutive pulses sandwiching the light pulses from the light pulse source (12), the first of which serves to discharge the capacitors (11) to a reference level prior to issue of a pulse by the light pulse source (12) and the second of which serves to effect read out from the capacitors (11) of the charge thereon deriving from the incident light from the preceding light pulse from the light pulse source (12), whereby the output of the sensor is not swamped by any stray charge on the capacitors (11).

2 Claims, 3 Drawing Sheets

OPTICAL SENSOR WITH PLURAL DETECTORS AND PULSE SANDWICHING

This invention relates to an optical sensor, and in particular to an optical sensor comprising a plurality of light-sensitive members each having an individually associated capacitor which is charged with a current dependent upon the incident light sensed by the associated light-sensitive member.

With such a sensor each capacitor receives a charge which is dependent upon the light incident on the associated light-sensitive member and the time over which such charge is accumulated.

With known sensors, for example line-scan sensors comprising a linear array of light-sensitive members, the charge accumulated by each capacitor is tranferred to an analogue shift-register and is then read out by way of a charge-to-current or a charge-to-voltage converter which provides the output signal of the sensor.

Read out by the converter serves to 'flush' the capacitors, removing the charge thereon, whereafter the cycle of operation of the sensor is repeated.

A difficulty that arises with such sensors is that light-sensitive members, for example light-sensitive diodes, generally exhibit some leakage current, referred to as 'dark current', which results in a charge on the associated capacitor in addition to that derived from the incident light. Such leakage current increases rapidly with increase in the ambient temperature, and thus the dark current charge becomes significant at elevated temperature operation of a sensor or if long charge accumulation periods are used. Thus, it can happen that a charge resulting from dark current saturates the sensor and swamps the required output signal of the sensor. Such difficulties limit the maximum operation temperature of known sensors, this in turn limiting their areas of use.

According to this invention there is provided an optical sensor comprising a plurality of light-sensitive members each having an individually associated capacitor which is charged with a current dependent upon the incident light sensed by the associated light-sensitive member; a light pulse source providing light pulses from which said incident light is derived; and a control pulse source providing pairs of consecutive pulses sandwiching the light pulses from the light pulse source, the first of which serves to discharge each capacitor to a reference level prior to issue of a pulse by said light pulse source and the second of which serves to effect read out from the capacitors of the charge thereon deriving from incident light from the preceding light pulse from the light pulse source.

With the sensor of this invention the first pulse of each pair from the control pulse source serves to clear the capacitors of any charge resulting from dark current in the period following the preceding read out from the capacitors, while the second pulse of each pair serves to effect read out of the charge on the capacitors resulting from incident light on the associated light-sensitive member, derived from the light pulse from the light pulse source, thereby ensuring the required output from the sensor is not swamped by charge on the capacitors resulting from dark current.

This invention will now be described by way of example with reference to the drawings, in which.

Figure 1:
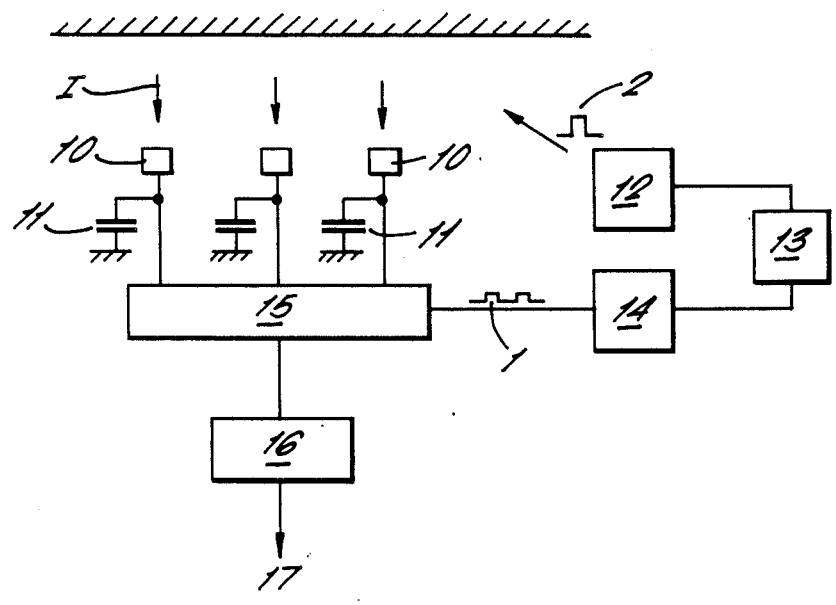
FIG. 1 is a block schematic diagram of a sensor according to the invention.

Referring to FIG. 1, the sensor comprises a linear array of light-sensitive diodes 10 each arranged to charge an associated capacitor 11. The diodes 10 receive incident light I derived from light pulses 2 from a light pulse source 12 controlled by a timer 13. The timer 13 also controls a control pulse generator 14 which provides control pulses 1 to an analogue shift register 15 to which the charges on the capacitors 11 are transferred. The register 15 is read out by a charge-to-current or charge-to-voltage converter 16 which provides the output signal 17 of the sensor.

Figure 2:
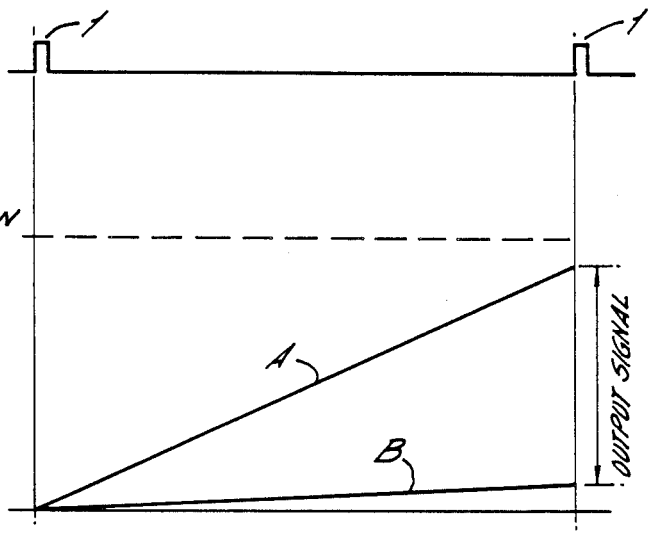
FIG. 2 is a diagram illustrating operation of a known sensor at low ambient temperatures.

Referring now to FIG. 2, this illustrates operation of a known optical sensor utilising continuous rather than pulse illumination from which detected incident light is derived. As shown, on issue of a control pulse 1 by a control pulse source the capacitors of the sensor commence to charge, the total charge being a combination of that deriving from the incident light on the light-sensitive members and that deriving from the leakage current of the members. Line A shows this combined charge, while line B shows the leakage current charge. As shown, at low ambient temperatures the combined charge (line A) does not result in saturation of the capacitors before issue of the next control pulse 1, at which the charge on the capacitors is read out to give the required output signal from the sensor, the capacitors being discharged by this action. As shown, the charge resulting from leakage current causes a shift in the level of the output signal and can be compensated for on interpretation of the output signal.

Figure 3:
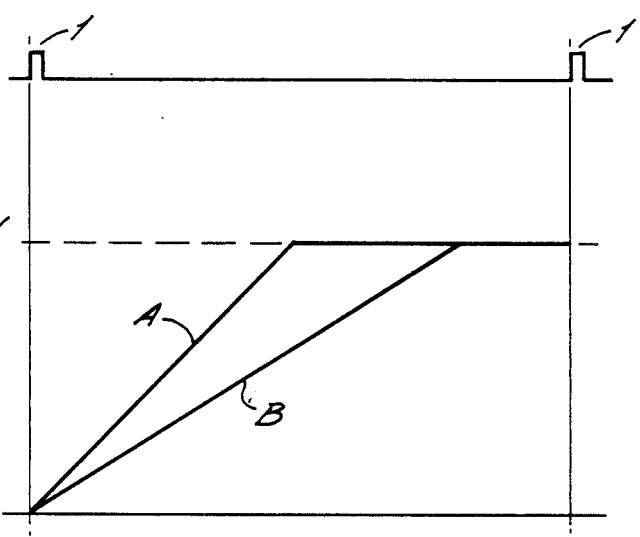
FIG. 3 is a diagram illustrating operation of the known sensor at high ambient temperature.

Referring now to FIG. 3, this is similar to FIG. 2, but illustrates operation of the known sensor at high ambient temperatures. As shown, during such operation the charge received by the capacitors deriving from the incident light and the leakage current, or even that resulting from leakage current alone, can result in the capacitors being charged to their saturation level thus making it impossible to derive the required output signal from the signal.

Figure 4:
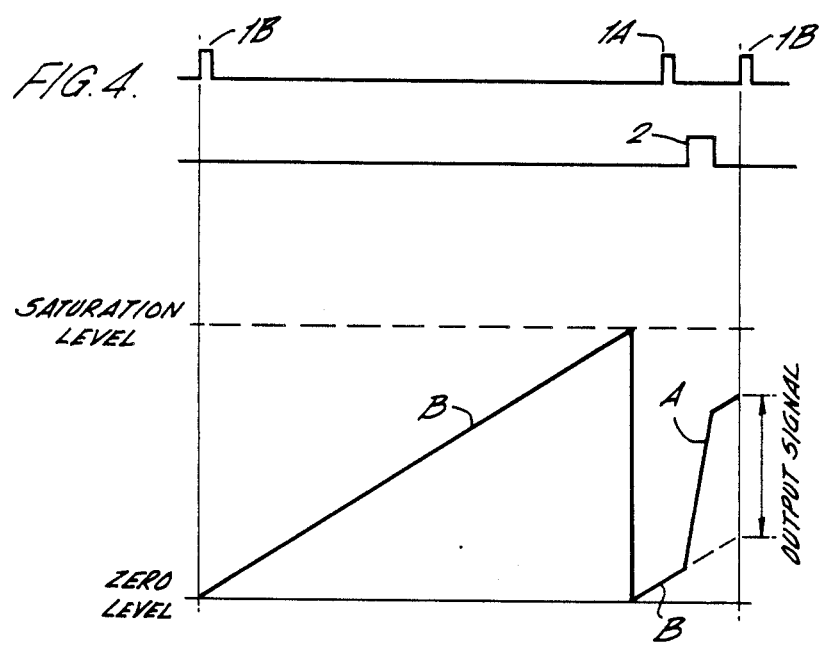
FIG. 4 is a diagram illustrating operation of a sensor according to the invention.

Referring now to FIG. 4, with the sensor of the invention the light pulse source provides light pulses 2 from which the incident light sensed by the light-sensitive members is derived. The control pulse source provides pairs of control pulses 1A and 1B timed to just precede and succeed a pulse 2 from the light pulse source. The first control pulse 1A of each pair serves to discharge the capacitors thus clearing them of any charge deriving from leakage current (line B) in the associated light-sensitive members. After control pulse 1A the capacitors commence to charge again, first from leakage current (line B), and then, on issue of the light pulse 2, in dependence upon the incident light on the associated light-sensitive members deriving from the light pulse 2. On occurence of control pulse 1B the charge on the capacitors is read out to provide the required output signal, as described for FIGS. 2 and 3, it being ensured that by this time the charge on the capacitors has not reached saturation level, as clearly shown in FIG. 4.

Figure 5:
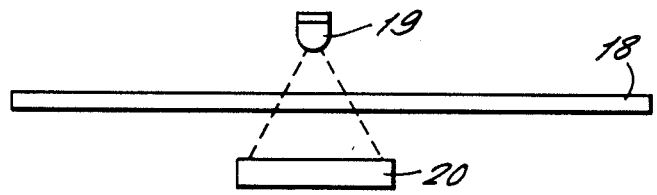
FIG. 5 is a diagrammatic representation of an optical digitizer.

The sensor of the invention is particularly suitable for use in reading an optical digitizer as shown in FIG. 5, comprising a digitizer disc 18, a flash illumination light source 19, and an optical sensor 20.

It is desirable to flash illuminate the scale on the disc 18 for reading by the sensor 20 in order to freeze any movement of the scale. For such reading there will generally be an interval between successive illuminating flashes from the source 19 which is long compared with the duration of each illuminating flash, and the sensor of the invention ensures that any leakage current of the light-sensitive members during such intervals would not prevent satisfactory operation of the sensor. Such operation also minimizes the average power consumed by the sensor enabling a high peak power for the illuminating pulses. Further, in view of its decreased temperature sensitivity the sensor of the invention can be used in aircraft where ambient temperatures in excess of 100° C. can be experienced.

In a practical embodiment of sensor according to the invention the light pulse source 19 provides a 40 ms pulse every 4 ms, thus giving a 100:1 reduction in the effect of the leakage current of the light-sensitive members.

I claim:

1. An optical sensor comprising a plurality of light-sensitive members each having an individually associated capacitor which is charged with a current dependent upon the incident light sensed by the associated light-sensitive member; a light pulse source providing light pulses from which said incident light is derived; and a control pulse source providing pairs of consecutive pulses sandwiching the light pulses from the light pulse source, the first of which serves to discharge the capacitor to a reference level prior to issue of a pulse by said light pulse source and the second of which serves to effect read out from the capacitors of the charge thereon deriving from incident light from the preceding light pulse from the light pulse source.

2. A sensor as claimed in claim 1, in which the charges on the capacitors are transferred to an analogue shift register for subsequent reading by a charge-to-current or charge-to-voltage converter to provide the output signal from the sensor.

* * * * *

UNITED STATES PATENT AND TRADEMARK OFFICE
CERTIFICATE OF CORRECTION

PATENT NO. : 4,987,294

DATED : January 22, 1991

INVENTOR(S) : Andrew Eugene Romer

It is certified that error appears in the above-identified patent and that said Letters Patent is hereby corrected as shown below:

On the Title page

In the title, delete "PLUAL", insert --PLURAL--

Signed and Sealed this

Twenty-sixth Day of January, 1993

Attest:

STEPHEN G. KUNIN

*Attesting Officer*   *Acting Commissioner of Patents and Trademarks*